(12) United States Patent
Brickell (10) Patent No.: US 8,924,728 B2
(45) Date of Patent: Dec. 30, 2014

(54) APPARATUS AND METHOD FOR ESTABLISHING A SECURE SESSION WITH A DEVICE WITHOUT EXPOSING PRIVACY-SENSITIVE INFORMATION

(75) Inventor: Ernest F. Brickell, Portland, OR (US)

(73) Assignee: Intel Corporation, Santa Clara, CA (US)

(*) Notice: Subject to any disclaimer, the term of this patent is extended or adjusted under 35 U.S.C. 154(b) by 2439 days.

(21) Appl. No.: 10/999,576

(22) Filed: Nov. 30, 2004

(65) Prior Publication Data

US 2006/0117181 A1      Jun. 1, 2006

(51) Int. Cl.
*H04L 29/06*       (2006.01)
*H04L 9/08*        (2006.01)
*H04L 9/32*        (2006.01)

(52) U.S. Cl.
CPC ............ *H04L 9/0844* (2013.01); *H04L 9/3271* (2013.01)
USPC .......................................... 713/176; 713/168

(58) Field of Classification Search
USPC ......................................................... 713/176
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. | 711/166 |
| 4,276,594 A | 6/1981 | Morley | |
| 4,278,837 A | 7/1981 | Best | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,347,565 A | 8/1982 | Kaneda et al. | |

(Continued)

FOREIGN PATENT DOCUMENTS

| | | |
|---|---|---|
| CN | 1985466 | 6/2007 |
| CN | 101019368 | 8/2007 |

(Continued)

OTHER PUBLICATIONS

Chang, Tin-Wei; "Efficient Authentication Schemes Based on Group Certificate and Their Application on Mobile Communication Systems", Department of Electrical Engineering, National Cheng Kung University, Tainan, Taiwan, Thesis for Master of Science, Published: Jun. 2003.*

(Continued)

*Primary Examiner* — Yogesh Paliwal
(74) *Attorney, Agent, or Firm* — Blakely, Sokoloff, Taylor & Zafman LLP (57) ABSTRACT

A method and apparatus for establishing a secure session with a device without exposing privacy-sensitive information are described. In one embodiment, the method includes the authentication of a digitally signed message received from a hardware device. In one embodiment, a digital signature, created by a private signature key of the hardware device, is authenticated according to a public key of an issuer without disclosure of an identity of the hardware device. The digital signature is a signature of an ephemeral DH public key, which the verifier is now assured comes from a trusted device. An encrypted and authenticated session ("secure session") is established with the authenticated hardware device according to a key exchange using this signed ephemeral DH public key. Other embodiments are described and claimed.

39 Claims, 7 Drawing Sheets

(56) References Cited

U.S. PATENT DOCUMENTS

| | | |
|---|---|---|
| 4,366,537 A | 12/1982 | Heller et al. |
| 4,403,283 A | 9/1983 | Myntti et al. |
| 4,419,724 A | 12/1983 | Branigin et al. |
| 4,430,709 A | 2/1984 | Schleupen et al. |
| 4,521,852 A | 6/1985 | Guttag |
| 4,529,870 A | 7/1985 | Chaum |
| 4,571,672 A | 2/1986 | Hatada et al. |
| 4,621,318 A | 11/1986 | Maeda .......................... 364/200 |
| 4,759,064 A | 7/1988 | Chaum |
| 4,795,893 A | 1/1989 | Ugon |
| 4,802,084 A | 1/1989 | Ikegaya et al. |
| 4,825,052 A | 4/1989 | Chemin et al. |
| 4,843,541 A | 6/1989 | Bean et al. |
| 4,907,270 A | 3/1990 | Hazard |
| 4,907,272 A | 3/1990 | Hazard |
| 4,910,774 A | 3/1990 | Barakat |
| 4,974,159 A | 11/1990 | Hargrove et al. |
| 4,975,836 A | 12/1990 | Hirosawa et al. |
| 5,007,082 A | 4/1991 | Cummins |
| 5,022,077 A | 6/1991 | Bealkowski et al. |
| 5,075,842 A | 12/1991 | Lai |
| 5,079,737 A | 1/1992 | Hackbarth .................... 711/164 |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,434,999 A | 7/1995 | Goire et al. |
| 5,437,033 A | 7/1995 | Inoue et al. |
| 5,442,645 A | 8/1995 | Ugon et al. |
| 5,455,909 A | 10/1995 | Blomgren et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,515,441 A * | 5/1996 | Faucher ........................ 380/30 |
| 5,522,075 A | 5/1996 | Robinson et al. |
| 5,528,231 A | 6/1996 | Patarin |
| 5,533,126 A | 7/1996 | Hazard et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,566,323 A | 10/1996 | Ugon |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,628,023 A | 5/1997 | Bryant et al. ................ 398/800 |
| 5,631,961 A | 5/1997 | Mills et al. |
| 5,633,929 A | 5/1997 | Kaliski, Jr. |
| 5,657,445 A | 8/1997 | Pearce |
| 5,668,971 A | 9/1997 | Neufeld |
| 5,680,547 A | 10/1997 | Chang |
| 5,684,948 A | 11/1997 | Johnson et al. |
| 5,699,431 A * | 12/1997 | Van Oorschot et al. ........ 380/30 |
| 5,706,469 A | 1/1998 | Kobayashi |
| 5,717,903 A | 2/1998 | Bonola |
| 5,720,609 A | 2/1998 | Pfefferle |
| 5,721,222 A | 2/1998 | Bernstein et al. |
| 5,724,425 A | 3/1998 | Chang et al. |
| 5,729,760 A | 3/1998 | Poisner |
| 5,737,604 A | 4/1998 | Miller et al. |
| 5,737,760 A | 4/1998 | Grimmer, Jr. et al. ........ 711/163 |
| 5,740,178 A | 4/1998 | Jacks et al. |
| 5,752,046 A | 5/1998 | Oprescu et al. |
| 5,757,918 A | 5/1998 | Hopkins et al. |
| 5,757,919 A | 5/1998 | Herbert et al. |
| 5,764,969 A | 6/1998 | Kahle et al. |
| 5,771,291 A | 6/1998 | Newton et al. |
| 5,796,835 A | 8/1998 | Saada |
| 5,796,845 A | 8/1998 | Serikawa et al. |
| 5,805,712 A | 9/1998 | Davis |
| 5,809,546 A | 9/1998 | Greenstein et al. |
| 5,815,665 A | 9/1998 | Teper et al. |
| 5,825,875 A | 10/1998 | Ugon |
| 5,825,880 A | 10/1998 | Sudia et al. |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,857,021 A | 1/1999 | Kataoka et al. |
| 5,867,577 A | 2/1999 | Patarin |
| 5,872,994 A | 2/1999 | Akiyama et al. |
| 5,890,189 A | 3/1999 | Nozue et al. |
| 5,900,606 A | 5/1999 | Rigal |
| 5,901,225 A | 5/1999 | Ireton et al. |
| 5,903,752 A | 5/1999 | Dingwall et al. |
| 5,919,257 A | 7/1999 | Trostle |
| 5,924,094 A | 7/1999 | Sutter |
| 5,935,242 A | 8/1999 | Madany et al. |
| 5,935,247 A | 8/1999 | Pai et al. |
| 5,937,063 A | 8/1999 | Davis |
| 5,944,821 A | 8/1999 | Angelo ........................ 364/200 |
| 5,953,502 A | 9/1999 | Helbig, Sr. |
| 5,956,408 A | 9/1999 | Arnold |
| 5,970,147 A | 10/1999 | Davis et al. |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,032,260 A | 2/2000 | Sasmazel et al. |
| 6,032,261 A | 2/2000 | Hulyalkar |
| 6,035,374 A | 3/2000 | Panwar et al. |
| 6,036,061 A | 3/2000 | O'Donnell |
| 6,036,601 A | 3/2000 | Heckel |
| 6,038,322 A | 3/2000 | Harkins |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,078,667 A | 6/2000 | Johnson |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,101,584 A | 8/2000 | Satou et al. |
| 6,108,644 A | 8/2000 | Goldschlag et al. |
| 6,115,816 A | 9/2000 | Davis |
| 6,125,430 A | 9/2000 | Noel et al. |
| 6,131,166 A | 10/2000 | Wong-Insley |
| 6,138,239 A | 10/2000 | Veil |
| 6,148,379 A | 11/2000 | Schimmel |
| 6,151,676 A | 11/2000 | Cuccia et al. |
| 6,154,841 A * | 11/2000 | Oishi ........................... 713/180 |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone |
| 6,182,089 B1 | 1/2001 | Ganapathy et al. |
| 6,185,316 B1 | 2/2001 | Buffam |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,246,771 B1 | 6/2001 | Stanton et al. |

(56) References Cited

U.S. PATENT DOCUMENTS

| | | | |
|---|---|---|---|
| 6,249,872 B1 | 6/2001 | Wildgrube et al. ............ 713/200 |
| 6,252,650 B1 | 6/2001 | Nakamura | |
| 6,269,392 B1 | 7/2001 | Cotichini et al. | |
| 6,272,533 B1 | 8/2001 | Browne et al. ............... 709/213 |
| 6,272,637 B1 | 8/2001 | Little et al. .................. 713/194 |
| 6,275,933 B1 | 8/2001 | Fine et al. | |
| 6,278,782 B1 | 8/2001 | Ober et al. | |
| 6,282,650 B1 | 8/2001 | Davis | |
| 6,282,651 B1 | 8/2001 | Ashe | |
| 6,282,657 B1 | 8/2001 | Kaplan et al. | |
| 6,292,874 B1 | 9/2001 | Barnett ......................... 711/153 |
| 6,301,646 B1 | 10/2001 | Hostetter | |
| 6,308,270 B1 | 10/2001 | Guthery et al. | |
| 6,314,409 B2 | 11/2001 | Schneck et al. | |
| 6,321,314 B1 | 11/2001 | Van Dyke | |
| 6,327,652 B1 | 12/2001 | England et al. | |
| 6,330,670 B1 | 12/2001 | England et al. | |
| 6,339,815 B1 | 1/2002 | Feng et al. | |
| 6,339,816 B1 | 1/2002 | Bausch | |
| 6,357,004 B1 | 3/2002 | Davis | |
| 6,363,485 B1 | 3/2002 | Adams | |
| 6,374,286 B1 | 4/2002 | Gee et al. | |
| 6,374,317 B1 | 4/2002 | Ajanovic et al. ............. 710/105 |
| 6,378,068 B1 | 4/2002 | Foster et al. | |
| 6,378,072 B1 | 4/2002 | Collins et al. | |
| 6,389,403 B1 | 5/2002 | Dorak, Jr. | |
| 6,389,537 B1 | 5/2002 | Davis et al. | |
| 6,397,242 B1 | 5/2002 | Devine et al. | |
| 6,397,379 B1 | 5/2002 | Yates, Jr. et al. | |
| 6,411,715 B1 | 6/2002 | Liskov et al. | |
| 6,412,035 B1 | 6/2002 | Webber | |
| 6,421,702 B1 | 7/2002 | Gulick | |
| 6,435,416 B1 | 8/2002 | Slassi | |
| 6,445,797 B1 | 9/2002 | McGough et al. | |
| 6,463,535 B1 | 10/2002 | Drews et al. | |
| 6,463,537 B1 | 10/2002 | Tello | |
| 6,473,508 B1 | 10/2002 | Young et al. | |
| 6,473,800 B1 | 10/2002 | Jerger et al. | |
| 6,496,847 B1 | 12/2002 | Bugnion et al. | |
| 6,499,123 B1 | 12/2002 | McFarland et al. | |
| 6,505,279 B1 | 1/2003 | Phillips et al. | |
| 6,507,904 B1 | 1/2003 | Ellison et al. | |
| 6,529,909 B1 | 3/2003 | Bowman-Amuah | |
| 6,535,988 B1 | 3/2003 | Poisner | |
| 6,557,104 B2 | 4/2003 | Vu et al. | |
| 6,560,627 B1 | 5/2003 | McDonald et al. | |
| 6,609,199 B1 | 8/2003 | DeTreville | |
| 6,615,278 B1 | 9/2003 | Curtis | |
| 6,633,963 B1 | 10/2003 | Ellison et al. | |
| 6,633,981 B1 | 10/2003 | Davis | |
| 6,651,171 B1 | 11/2003 | England et al. | |
| 6,678,825 B1 | 1/2004 | Ellison et al. | |
| 6,684,326 B1 | 1/2004 | Cromer et al. | |
| 6,711,263 B1 | 3/2004 | Nordenstam et al. | |
| 6,738,904 B2 | 5/2004 | Linnartz et al. | |
| 6,792,113 B1 | 9/2004 | Ansell et al. | |
| 6,826,616 B2 | 11/2004 | Larson et al. | |
| 6,987,853 B2 | 1/2006 | Uner | |
| 6,988,250 B1 | 1/2006 | Proudler et al. | |
| 7,028,149 B2 | 4/2006 | Grawrock et al. | |
| 7,133,990 B2 | 11/2006 | Link et al. | |
| 7,165,181 B2 | 1/2007 | Brickell | |
| 7,178,030 B2 | 2/2007 | Scheidt et al. | |
| 7,181,620 B1 | 2/2007 | Hur | |
| 7,216,110 B1 | 5/2007 | Ogg et al. | |
| 7,233,666 B2 | 6/2007 | Lee et al. | |
| 7,299,500 B1 | 11/2007 | Klebe et al. | |
| 7,526,651 B2 | 4/2009 | Arditti Modiano et al. | |
| 2001/0011267 A1 | 8/2001 | Kihara et al. | |
| 2001/0021969 A1 | 9/2001 | Burger et al. | |
| 2001/0027511 A1 | 10/2001 | Wakabayashi et al. | |
| 2001/0027527 A1 | 10/2001 | Khidekel et al. | |
| 2001/0037450 A1 | 11/2001 | Metlitski et al. | |
| 2001/0044786 A1 | 11/2001 | Ishibashi | |
| 2001/0044886 A1 | 11/2001 | Cassagnol et al. | |
| 2002/0004900 A1 | 1/2002 | Patel | |
| 2002/0007456 A1 | 1/2002 | Peinado et al. | |
| 2002/0012432 A1* | 1/2002 | England et al. ................ 380/231 |
| 2002/0023032 A1 | 2/2002 | Pearson et al. | |
| 2002/0044567 A1 | 4/2002 | Voit et al. | |
| 2002/0048369 A1 | 4/2002 | Ginter et al. | |
| 2002/0065136 A1 | 5/2002 | Day | |
| 2002/0080190 A1 | 6/2002 | Hamann et al. | |
| 2002/0147916 A1 | 10/2002 | Strongin et al. | |
| 2002/0166053 A1 | 11/2002 | Wilson | |
| 2002/0166061 A1 | 11/2002 | Falik et al. | |
| 2002/0169717 A1 | 11/2002 | Challener | |
| 2002/0178354 A1 | 11/2002 | Ogg et al. | |
| 2002/0178534 A1 | 12/2002 | Massaro | |
| 2002/0198302 A1 | 12/2002 | Rouse et al. | |
| 2003/0002668 A1 | 1/2003 | Graunke et al. | |
| 2003/0018892 A1 | 1/2003 | Tello | |
| 2003/0037237 A1 | 2/2003 | Abgrall et al. | |
| 2003/0041250 A1* | 2/2003 | Proudler ....................... 713/182 |
| 2003/0074548 A1 | 4/2003 | Cromer et al. | |
| 2003/0105718 A1 | 6/2003 | Hurtado et al. | |
| 2003/0112008 A1 | 6/2003 | Hennig | |
| 2003/0114144 A1 | 6/2003 | Minemura | |
| 2003/0115453 A1 | 6/2003 | Grawrock | |
| 2003/0126442 A1 | 7/2003 | Glew et al. | |
| 2003/0126453 A1 | 7/2003 | Glew et al. | |
| 2003/0159056 A1 | 8/2003 | Cromer et al. | |
| 2003/0182584 A1 | 9/2003 | Banes et al. | |
| 2003/0188156 A1 | 10/2003 | Yasala et al. | |
| 2003/0188179 A1 | 10/2003 | Challener et al. | |
| 2003/0195857 A1 | 10/2003 | Acquisti | |
| 2003/0196085 A1 | 10/2003 | Lampson et al. | |
| 2003/0231328 A1 | 12/2003 | Chapin et al. | |
| 2003/0235175 A1 | 12/2003 | Naghiam et al. | |
| 2004/0003324 A1 | 1/2004 | Uhlig et al. | |
| 2004/0039924 A1 | 2/2004 | Baldwin et al. | |
| 2004/0064694 A1 | 4/2004 | Lee et al. | |
| 2004/0103281 A1 | 5/2004 | Brickell | |
| 2004/0117539 A1 | 6/2004 | Bennett et al. | |
| 2004/0123288 A1 | 6/2004 | Bennett et al. | |
| 2004/0240667 A1 | 12/2004 | Lee et al. | |
| 2004/0260926 A1 | 12/2004 | Arditti Modiano et al. | |
| 2005/0010535 A1 | 1/2005 | Camenisch | |
| 2005/0081038 A1* | 4/2005 | Arditti Modiano et al. .. 713/176 |
| 2005/0100161 A1 | 5/2005 | Husemann et al. | |
| 2005/0114682 A1* | 5/2005 | Zimmer et al. ............... 713/187 |
| 2005/0154890 A1* | 7/2005 | Vembu .......................... 713/171 |
| 2005/0283586 A1 | 12/2005 | Mondal et al. | |
| 2006/0013399 A1 | 1/2006 | Brickell et al. | |
| 2006/0013400 A1 | 1/2006 | Sutton | |
| 2006/0013402 A1 | 1/2006 | Sutton et al. | |
| 2006/0020786 A1 | 1/2006 | Helms et al. | |
| 2006/0117181 A1 | 6/2006 | Brickell | |
| 2007/0192829 A1 | 8/2007 | Ford | |

FOREIGN PATENT DOCUMENTS

| | | | |
|---|---|---|---|
| CN | 101019369 | 8/2007 | |
| DE | 4217444 | 12/1992 | |
| DE | 10218835 A1 | 4/2002 | |
| DE | 112005001666 T5 | 5/2007 | |
| DE | 112005001672 T | 5/2007 | |
| DE | 112005001654 T5 | 11/2007 | |
| EP | 0473913 | 3/1992 | |
| EP | 0 492 692 | 7/1992 | |
| EP | 0600112 | 6/1994 | |
| EP | 0602867 | 6/1994 | ............. G06F 12/14 |
| EP | 0877314 | 11/1998 | |
| EP | 0892521 | 1/1999 | |
| EP | 0930567 | 7/1999 | |
| EP | 0961193 | 12/1999 | |
| EP | 0965902 | 12/1999 | |
| EP | 1030237 | 8/2000 | |
| EP | 1055989 | 11/2000 | |
| EP | 1056014 | 11/2000 | |
| EP | 1067470 | 1/2001 | |
| EP | 1085396 | 3/2001 | |
| EP | 1146715 | 10/2001 | |
| EP | 1209563 | 5/2002 | ............. G06F 9/445 |

(56) References Cited

FOREIGN PATENT DOCUMENTS

| | | |
|---|---|---|
| EP | 1271277 | 1/2003 |
| EP | 1617587 A1 | 1/2006 |
| FR | 2620248 | 3/1989 |
| FR | 2700430 | 7/1994 |
| FR | 2714780 | 7/1995 |
| FR | 2742618 | 6/1997 |
| FR | 2752122 | 2/1998 |
| FR | 2763452 | 11/1998 |
| FR | 2830147 | 3/2003 |
| GB | 2439160 | 12/2007 |
| JP | 2000076139 | 3/2000 |
| JP | 2006293472 | 10/2006 |
| WO | WO9524696 | 9/1995 |
| WO | WO9729567 | 8/1997 |
| WO | WO9812620 | 3/1998 |
| WO | WO9834365 | 8/1998 |
| WO | WO9844402 | 10/1998 |
| WO | WO9905600 | 2/1999 |
| WO | WO9909482 | 2/1999 |
| WO | WO9918511 | 4/1999 |
| WO | WO-9931842 | 6/1999 |
| WO | WO9957863 | 11/1999 |
| WO | WO9965579 | 12/1999 |
| WO | WO0021238 | 4/2000 |
| WO | WO-0049764 | 8/2000 |
| WO | WO0062232 | 10/2000 |
| WO | WO-0069206 | 11/2000 |
| WO | WO0127723 | 4/2001 |
| WO | WO0127821 | 4/2001 |
| WO | WO-0143476 | 6/2001 |
| WO | WO-0163954 | 8/2001 |
| WO | WO0163994 | 8/2001 |
| WO | WO0175564 | 10/2001 |
| WO | WO0175565 | 10/2001 |
| WO | WO0175595 | 10/2001 |
| WO | WO0201794 | 1/2002 |
| WO | WO0217555 | 2/2002 |
| WO | WO-0245452 | 6/2002 |
| WO | WO-0245453 | 6/2002 |
| WO | WO02060121 | 8/2002 |
| WO | WO-02073928 | 9/2002 |
| WO | WO02086684 | 10/2002 |
| WO | WO03058412 | 7/2003 |
| WO | WO-2006019614 | 2/2006 |
| WO | WO-2006023151 | 3/2006 |
| WO | WO-2006025952 | 3/2006 |

OTHER PUBLICATIONS

Menezes, Vanstone, Oorschot: "Handbook of Applied Cryptography", CRC Press LLC, USA, 1997, pp. 405-406, 409-410, 433-435, 576-580. XP002353062.
Ateniese, Giuseppe, et al., "A Practical and Provably Secure Coalition-Resistant Group Signature Scheme", *Advances in Cryptology—CRYPTO2000*, vol. 1880 of Lecture Notes in Computer Sciemce, Int'; Assoc for Crypt Res, Spring-Verlag, Berlin, Germany,(2000),255-270.
Berg, Cliff, "How Do I Create a Signed Applet?", *Dr. Dobb's Journal*, (Aug. 1997),1-9.
Brands, Stefan, "Restrictive Blinding of Secret-Key Certificates", Springer-Verlag XP002201306, (1995),Chapter 3.
Chien, Andrew A., et al., "Safe and Protected Execution for the Morph/AMRM Reconfigurable Processor",*7th Annual IEEE Symposium, FCCM '99 Proceedings*, XP010359180, ISBN 0-7695-0375-6, Los Alamitos, CA, (Apr. 21, 1999),209-221.
Compaq Computer Corporation, "Trusted Computing Platform Alliance (TCPA) Main Specification Version 1.1a", XP002272822 (Jan. 25, 2001),1-321.
Coulouris, George, et al., "Distributed Systems, Concepts and Designs", 2nd Edition (1994),422-424.
Crawford, John, "Architecture of the Intel 80386", *Proceedings of the IEEE International Conference on Computer Design: VLSI in Computers and Processors (ICCD '86)*, (Oct. 6, 1986),155-160.

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).
Fabry, R.S., "Capability-Based Addressing" Fabry, R.S., "Capability-Based Addressing," *Communications of the ACM*, vol. 17, No. 7, (Jul. 1974),403-412.
Frieder, Gideon, "The Architecture and Operational Characteristics of the Vmx Host Machine", *The Architecture and Operational Characteristics of the VMX Host Machine, IEEE*, (1982),9-16.
Goldberg, Robert P., "Survey of Virtual Machine Research", *Computer Magazine*, (Jun. 1974),34-35.
Gong, Li, et al., "Going Behond the Sandbox: An Overview of the New Security Architecture in the Java Development Kit 1.2", *Proceedings of the USENIX Symposium on Internet Technologies and Systems*, Monterey, CA,(Dec. 1997).
Gum, P. H., "System/370 Extended Architecture: Facilities for Virtual Machines", *IBM J. Research Development*, vol. 27, No. 6, (Nov. 1983),530-544.
Heinrich, Joe, "MIPS R4000 Microprocessor User's Manual, Second Edition", Chapter 4 "*Memory Management*", (Jun. 11, 1993),61-97.
HP Mobile Security Overview, "HP Mobile Security Overview", (Sep. 2002),1-10.
IBM, "Information Display Technique for a Terminate Stay Resident Program IBM Technical Disclosure Bulletin", TDB-ACC-No. NA9112156, vol. 34, Issue 7A, (Dec. 1, 1991),156-158.
IBM Corporation, "IBM ThinkPad T30 Notebooks", *IBM Product Specification*, located at www-1.ibm.com/services/files/cisco_t30_spec_sheet_070202.pdf, last visited Jun. 23, 2004,(Jul. 2, 2002),1-6.
Intel, "IA-32 Intel Architecture Software Developer's Manual", *vol. 3: System Programming Guide*, Intel Corporation—2003,13-1 through 13-24.
Intel, "Intel386 DX Microprocessor 32-Bit CHMOS Microprocessor With Integrated Memory Management", (1995),5-56.
Intel Corporation, "IA-64 System Abstraction Layer Specification", *Intel Product Specification*, Order No. 245359-001, (Jan. 2000),1-112.
Intel Corporation, "Intel 82802AB/82802AC Firmware Hub (FWH)", *Intel Product Datasheet*, Document No. 290658-004,(Nov. 2000),1-6, 17-28.
Intel Corporation, "Intel IA-64 Architecture Software Developer's Manual", *vol. 2: IA-64 System Architecture*, Order No. 245318-001, (Jan. 2000),i, ii, 5.1-5.3, 11.1-11.8, 11.23-11.26.
Karger, Paul A., et al., "A VMM Security Kernal for the VAX Architecture", *Proceedings of the Symposium on Research in Security and Privacy*, XP010020182 ISBN 0-8186-2060-9, Boxborough, MA, (May 7, 1990),2-19.
Kashiwagi, Kazuhiko, et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).
Lawton, Kevin, et al., "Running Multiple Operating Systems Concurrently on an IA32 PC Using Virtualization Techniques", http://www.plex86.org/research/paper.txt, (Nov. 29, 1999),1-31.
Luke, Jahn, et al., "Replacement Strategy for Aging Avionics Computers", *IEEE AES Systems Magazine*, XP002190614,(Mar. 1999).
Menezes, Alfred J., et al., "Handbook of Applied Crypography", *CRC Press Series on Discrete Mathematices and its Applications*, Boca Raton, FL, XP002165287, ISBN 0849385237,(Oct. 1996),403-405, 506-515, 570.
Motorola, "M68040 User's Manual", (1993),1-1 to 8-32.
Nanba, S., "VM/4: ACOS-4 Virtual Machine Architecture", *VM/4: ACOS-4 Virtial Machine Architecture, IEEE*, (1985),171-178.
Robin, John S., et al., "Analysis of the Pentium's Ability to Support a Secure Virtual Machine Monitor", *Proceedings of the 9th USENIX Security Symposium*, XP002247347, Denver, Colorado, (Aug. 14, 2000),1-17.
Rosenblum, M., "Virtual Platform: A Virtual Machine Monitor for Commodity PC", *Proceedings of the 11th Hotchips Conference*, (Aug. 17, 1999),185-196.

(56) References Cited

OTHER PUBLICATIONS

RSA Security, "Hardware Authenticators", www.rsasecurity.com/node.asp?id=1158, 1-2.
RSA Security, "RSA SecurID Authenticators", www.rsasecurity.com/products/securid/datasheets/SID_DS_0103.pdf, 1-2.
RSA Security, "Software Authenticators", www.srasecurity.com/node.asp?id=1313, 1-2.
Saez, Sergio, et al., "A Hardware Scheduler for Complex Real-Time Systems", *Proceedings of the IEEE International Symposium on Industrial Electronics*, XP002190615,(Jul. 1999),43-48.
Schneier, Bruce, "Applied Cryptography: Protocols, Algorithm, and Source Code in C", Wiley, John & Sons, Inc., XP002939871; ISBN 0471117099,(Oct. 1995),47-52.
Schneier, Bruce, "Applied Cryptography: Protocols, Algorithm, and Source Code in C", Wiley, John & Sons, Inc., XP002138607; ISBN 0471117099,(Oct. 1995),56-65.
Schneier, Bruce, "Applied Cryptography: Protocols, Algorithms, and Source Code in C", Wiley, John & Sons, Inc., XP0021111449; ISBN 0471117099,(Oct. 1995),169-187.
Schneier, Bruce, "Applied Cryptography: Protocols, Algorithms, and Source Code in C", 2nd Edition; Wiley, John & Sons. Inc., XP002251738; ISBN 0471128457,(Nov. 1995),28-33; 176-177; 216-217; 461-473; 518-522.
Sherwood, Timothy, et al., "Patchable Instruction ROM Architecture", Department of Computer Science and Engineering, University of California, San Diego, La Jolla, CA, (Nov. 2001).
Hall, J. S., et al., "Virtualizing the VAX Architecture", ACM SIGARCH Computer Architecture News, Proceedings of the 18th Annual International Symposium on Computer Architecture, vol. 19, Issue No. 3, (Apr. 1991), 10 pages.
Intel Corporation, Final Office Action mailed Jul. 9, 2008, U.S. Appl. No. 10/782,572, 9 pages.
Intel Corporation, Office Action mailed Dec. 23, 2008, U.S. Appl. No. 10/782,572, 8 pages.
Intel Corporation, Office Action mailed Jul. 22, 2009, U.S. Appl. No. 10/782,572, 10 pages.
Intel Corporation, Notice of Allowance mailed Dec. 11, 2008, U.S. Appl. No. 10/866,252, 7 pages.
Rosenberg, J. B., "How Debuggers Work (Algorithms, Data Structures, and Architecture", Chapters 3 and 5 Hardware Debugger Facilities, Wiley Computer Publishing, United States, (1996), pp. 42-43, 95, 96 and 99.
Hawthorne, W. M., "An Alternative to Public Key Encryption", European Convention on Security and Detection, Found at: http://ieeexplore.ieee.org/stamp/stamp.jsp?tp=&arnumber=491615&isnumber=10615, (May 1995), 142-145.
Intel Corporation, U.S. Patent and Trademark Office Official Action in related U.S. Appl. No. 10/892,256 dated Sep. 29, 2008, with corresponding Reply to Official Action filed Dec. 24, 2008.
Intel Corporation, U.S. Patent and Trademark Office Official Action in related U.S. Appl. No. 10/892,280 dated Nov. 26, 2008.
Intel Corporation, U.S. Patent and Trademark Office Official Action in related U.S. Appl. No. 10/892,280 dated Sep. 12, 2007, with corresponding Reply to Official Action filed Jan. 24, 2008.
Intel Corporation, U.S. Patent and Trademark Office Final Official Action in related U.S. Appl. No. 10/892,280 dated May 14, 2008, with corresponding Reply to Final Official Action filed Jul. 9, 2008.
Intel Corporation, U.S. Patent and Trademark Office Official Action in related U.S. Appl. No. 10/892,256 dated Jul. 23, 2007, with corresponding Reply to Official Action filed Dec. 20, 2007.
Intel Corporation, U.S. Patent and Trademark Office Final Official Action in related U.S. Appl. No. 10/892,256 dated Apr. 1, 2008, with corresponding Reply to Final Official Action filed May 30, 2008, Advisory Action mailed on Jun. 16, 2008.
Intel Corporation, PCT International Search Report and Written Opinion of the International Searching Authority, Application No. PCT/US2005/024486, mailed Sep. 18, 2006.
Intel Corporation, PCT Preliminary Report on Patentability (Chapter 1 of the Patent Cooperation Treaty), Application No. PCT/US2005/024486, mailed Jan. 25, 2007.
Intel Corporation, PCT International Search Report and Written Opinion of the International Searching Authority, Application No. PCT/US2005/024374, mailed Sep. 18, 2006.
Intel Corporation, PCT Preliminary Report on Patentability (Chapter 1 of the Patent Cooperation Treaty), Application No. PCT/US2005/024374, mailed Jan. 25, 2007.
Intel Corporation, PCT International Search Report and Written Opinion of the International Searching Authority, Application No. PCT/US2005/024251, mailed Oct. 6, 2005.
Intel Corporation, PCT International Search Report and Written Opinion of the International Searching Authority, Application No. PCT/US2005/024253, mailed Sep. 18, 2006.
Intel Corporation, PCT Preliminary Report on Patentability (Chapter 1 of the Patent Cooperation Treaty), Application No. PCT/US2005/024253, mailed Jan. 25, 2007.
Intel Corporation, U.S. Patent and Trademark Office, Final Office Action dated Mar. 24, 2009 in related U.S. Appl. No. 10/892,256.
Intel Corporation, U.S. Patent and Trademark Office, Office Action dated Jun. 15, 2009, with Reply to Office Action filed on Sep. 15, 2009, in related U.S. Appl. No. 10/892,265.
Intel Corporation, U.S. Patent and Trademark Office Official Action in related U.S. Appl. No. 10/892,265 dated Nov. 25, 2008, with corresponding Reply to Official Action filed Feb. 25, 2009.
Intel Corporation, U.S. Patent and Trademark Office Official Action in related U.S. Appl. No. 10/892,265 dated Sep. 12, 2007, with corresponding Reply to Official Action filed Jan. 24, 2008.
Intel Corporation, U.S. Patent and Trademark Office Final Official Action in related U.S. Appl. No. 10/892,265 dated Apr. 17, 2008, with corresponding Reply to Final Official Action filed Jun. 17, 2008.
Intel Corporation, Non-Final Office Action mailed Jun. 2, 2009, U.S. Appl. No. 11/387,203, filed Mar. 22, 2006, First Named Inventor: Ernest Brickell.
Intel Corporation, Final Office Action mailed Dec. 7, 2009, U.S. Appl. No. 11/387,203, filed Mar. 22, 2006.
Menezes, Alfred J., et al., Handbook of Applied Cryptography, CRC Press, LLC, pp. 321-322, 330-331, 388-390, 394-395, 397-398, 472, 515-516, 548-552, (1997).
Menezes, Alfred J., et al., "Hash Functions and Data Integrity", Handbook of Applied Cryptography, CRC Press Inc., 1997, Chapter 9.
Schneier, Bruce, Applied Cryptography Second Edition, John Wiley & Sons, (1996), pp. 513-514.

* cited by examiner

APPARATUS AND METHOD FOR ESTABLISHING A SECURE SESSION WITH A DEVICE WITHOUT EXPOSING PRIVACY-SENSITIVE INFORMATION

FIELD OF THE INVENTION

One or more embodiments of the invention relate generally to the field of cryptography. More particularly, one or more of the embodiments of the invention relates to a method and apparatus for establishing a secure session with a device without exposing privacy-sensitive information.

BACKGROUND OF THE INVENTION

Various system architectures support the use of specially-protected, "trusted" software modules, such as, for example, to perform specific tamper-resistant software, or systems using technology to run protected applications sensitive activities, even in the presence of other hostile software in the system. Some of these trusted software modules require equivalently "trustable" protected access to peripheral devices. In general, such access requires that the trusted software be able to: identify the device's capabilities and/or specific identity, and then establish a secure session with the device to permit the exchange of data that cannot be snooped or spoofed by other software in the system.

The traditional method of both identifying the device and simultaneously establishing the encrypted session is to use a one-side authenticated Diffie-Hellman (DH) key exchange process. In this process, a device is assigned a unique DH public/private key pair. The device holds and protects the private key, while the public key, along with authenticating certificates, may be released to the software. During the DH key exchange process, the software obtains the certificate of the device and verifies the devices' certificate. The software then generates a random ephemeral DH public/private key pair and sends the ephemeral public key to the device. The device computes a shared secret using the device private key and the software ephemeral public key. The software computes a shared secret using the device public key and the software ephemeral private key. Following the Diffie Hellman protocol, the software and the device will compute the same shared secret. The software knows that the shared secret is known only to a trusted device because of the certificate on the public key of the device. The shared secret can now be used to encrypt and authenticate messages between the software and the device.

However, because this authentication process uses conventional private/private key pairs, the device discloses a unique and provable identity (i.e., its public key) as part of the authentication process. Any software that can get the device to engage in a key exchange with its private key can prove that this specific, unique device key is present in a system. Given that devices rarely migrate between systems, this also represents a provable unique system identity. Furthermore, the device's public key itself represents a constant unique value; effectively a permanent "cookie". In some circles, these characteristics will be construed as a significant privacy problem.

Current architectures may attempt to address this problem by providing mechanisms that limit which software has access to the device's public key and which may ask the device to sign a message. However, these solutions tend to be severely limited in application, often solving the problem only for a small subset of the problem space.

BRIEF DESCRIPTION OF THE DRAWINGS

The various embodiments of the present invention are illustrated by way of example, and not by way of limitation, in the figures of the accompanying drawings and in which.

DETAILED DESCRIPTION

A method and apparatus for establishing a secure session with a device without exposing privacy-sensitive information are described. In one embodiment, the method includes the authentication of a digitally signed message received from a hardware device. In one embodiment, a digital signature, created by a private signature key of the hardware device, is authenticated according to a public key of an issuer without disclosure of an identity of the hardware device. The digital signature is a signature of an ephemeral DH public key, which the verifier is now assured comes from a trusted device. An encrypted and authenticated session ("secure session") is established with the authenticated hardware device according to a key exchange using this signed ephemeral DH public key.

Accordingly, in one embodiment, a verifier, in the form of a protected software module, is able to authenticate an identified hardware device as a trusted hardware device (THD) without requiring disclosure of privacy-sensitive information from the hardware device, which may be used to subsequently identify the hardware device. For one embodiment, the functionality of the THD, which responds to a one-way authentication request from a verifier is deployed as firmware. However, it is contemplated that such functionality may be deployed as dedicated hardware or software. Instructions or code forming the firmware or software are stored on a machine-readable medium.

Herein, "machine-readable medium" may include, but is not limited to a floppy diskette, hard disk, optical disk (e.g., CD-ROMs, DVDs, mini-DVDs, etc.), magneto-optical disk, semiconductor memory such as read-only memory (ROM), random access memory (RAM), any type of programmable read-only memory (e.g., programmable read-only memory "PROM", erasable programmable read-only memories "EPROM", electrically erasable programmable read-only memories "EEPROM", or flash), magnetic or optical cards, or the like. It is contemplated that a signal itself and/or a communication link can be regarded as machine-readable medium since software may be temporarily stored as part of a downloaded signal or during propagation over the communication link.

In the following description, certain terminology is used to describe certain features of one or more embodiments of the invention. For instance, "platform" is defined as any type of communication device that is adapted to transmit and receive information. Examples of various platforms include, but are not limited or restricted to computers, personal digital assistants, cellular telephones, set-top boxes, facsimile machines, printers, modems, routers, or the like. A "communication link" is broadly defined as one or more information-carrying mediums adapted to a platform. Examples of various types of communication links include, but are not limited or restricted to electrical wire(s), optical fiber(s), cable(s), bus trace(s), or wireless signaling technology.

A "verifier" refers to any entity (e.g., person, platform, system, software, and/or device) that requests some verification of authenticity or authority from another entity. Normally, this is performed prior to disclosing or providing the requested information. A "prover" refers to any entity that has been requested to provide some proof of its authority, validity, and/or identity. A "device manufacturer," which may be used interchangeably with "certifying manufacturer," refers to any entity that manufactures or configures a platform or device (e.g., a Trusted Hardware Device).

As used herein, to "prove" or "convince" a verifier that a prover has possession or knowledge of some cryptographic information (e.g., signature key, a private key, etc.) means that, based on the information and proof disclosed to the verifier, there is a high probability that the prover has the cryptographic information. To prove this to a verifier without "revealing" or "disclosing" the cryptographic information to the verifier means that, based on the information disclosed to the verifier, it would be computationally infeasible for the verifier to determine the cryptographic information. Such proofs are hereinafter referred to as direct proofs. The term "direct proof" is a type of zero-knowledge proof, as these types of proofs are commonly known in the field.

Throughout the description and illustration of the various embodiments discussed hereinafter, coefficients, variables, and other symbols (e.g., "h") are referred to by the same label or name. Therefore, where a symbol appears in different parts of an equation as well as different equations or functional description, the same symbol is being referenced.

I. General Architecture

Figure 1:
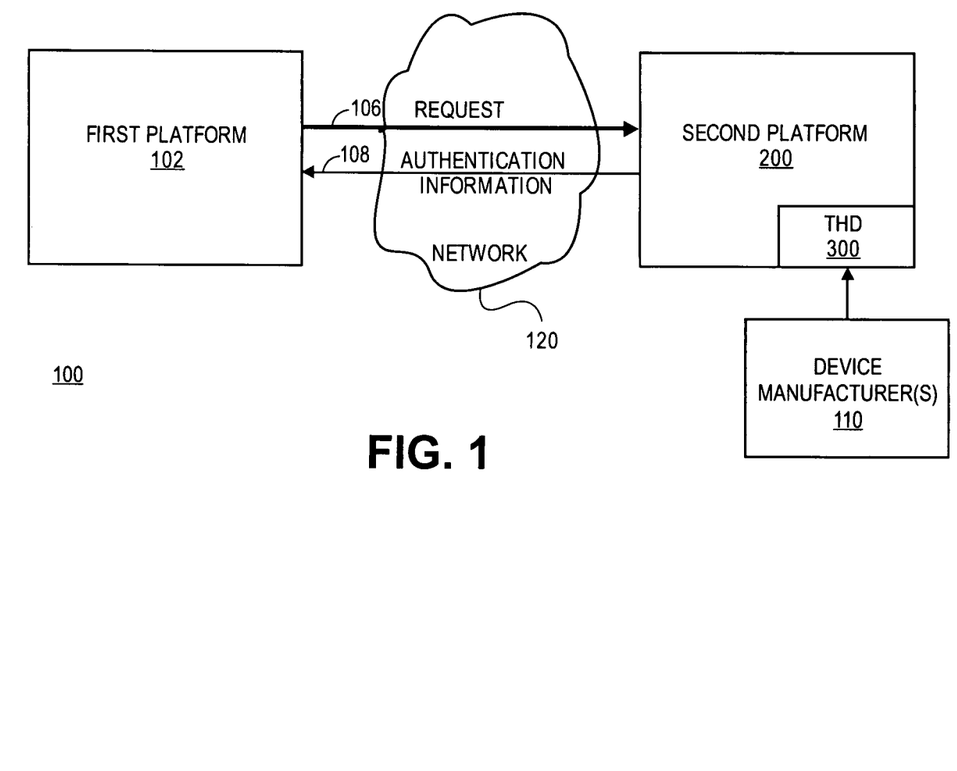
FIG. 1 is a block diagram illustrating a system featuring a platform implemented with a trusted hardware device (THD), in accordance with one embodiment.

FIG. 1 illustrates system 100 featuring a platform implemented with a trusted hardware device (THD) in accordance with one embodiment. A verifier platform 102 (Verifier Platform) transmits an authentication request 106 to a prover platform 200 (Prover Platform) via network 120. In response to request 106, prover platform 200 provides the authentication information 108. In one embodiment, network 120 forms part of a local or wide area network, and/or a conventional network infrastructure, such as a company's Intranet, the Internet, or other like network.

Additionally, for heightened security, verifier platform 102 may need to verify that prover platform 200 is manufactured by either a selected device manufacturer or a selected group of device manufacturers (hereinafter referred to as "device manufacturer(s) 110"). In one embodiment, verifier platform 102 challenges prover platform 200 to show that it has cryptographic information (e.g., a private signature key) generated by device manufacturer(s) 110. Prover platform 200 replies to the challenge by providing authentication information, in the form of a reply, to convince verifier platform 102 that prover platform 200 has cryptographic information generated by device manufacturer(s) 110, without revealing the cryptographic information or any unique, device/platform identification information.

Figure 2:
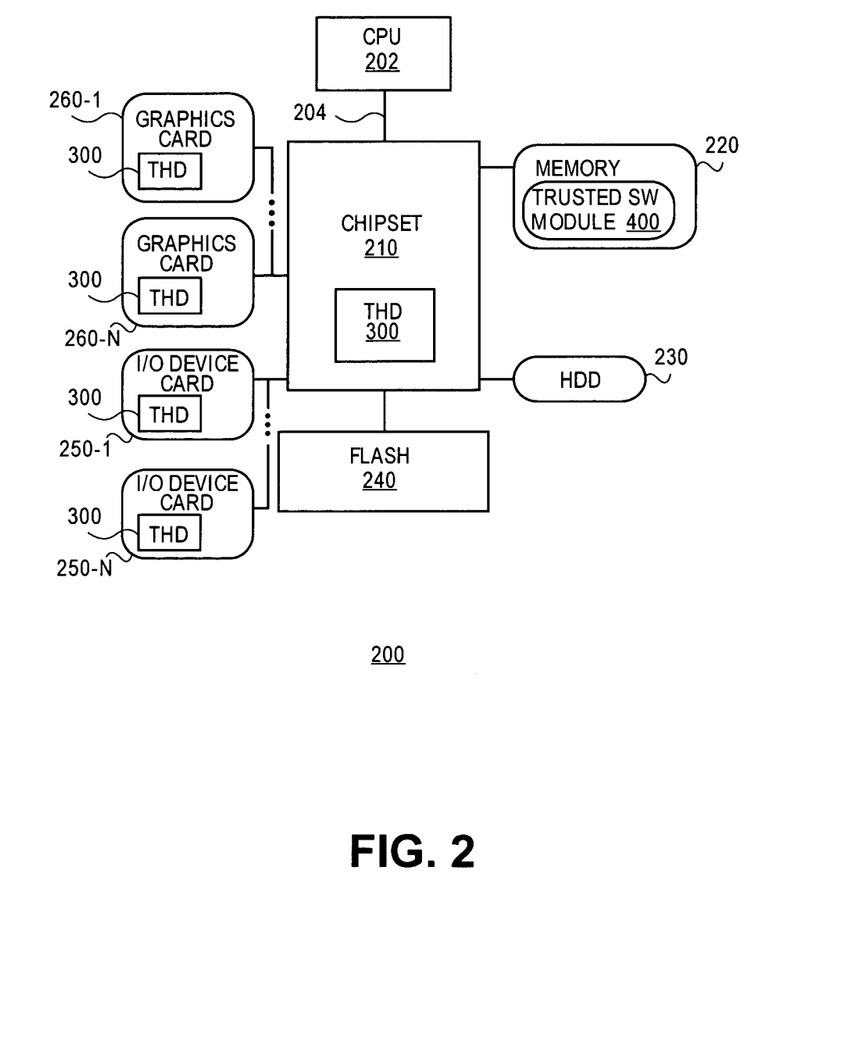
FIG. 2 is a block diagram further illustrating the platform of FIG. 1 implemented with the THD, in accordance with one embodiment.

FIG. 2 is a block diagram further illustrating prover platform 200 including THD 300 to convince a verifier that prover platform 200 possesses uncompromised cryptographic information without disclosure of the cryptographic information or any unique device identification information. Representatively, prover platform 200 comprises a processor system bus (front side bus (FSB)) 204 for communicating information between processor (CPU) 202 and chipset 210. As described herein, the term "chipset" is used in a manner to collective describe the various devices coupled to CPU 202 to perform desired system functionality.

Representatively, hard drive devices (HDD) 230 and main memory 220 may be coupled to chipset 210. In one embodiment, chipset 210 includes a memory controller and/or an input/output (I/O) controller to communicate with I/O devices 250 (250-1, ..., 250-N). In one embodiment, chipset 210 is a graphics controller to communicate with graphics cards 260 (260-1, ..., 260-N). In one embodiment, main memory 212 may include, but is not limited to, random access memory (RAM), dynamic RAM (DRAM), static RAM (SRAM), synchronous DRAM (SDRAM), double data rate (DDR) SDRAM (DDR-SDRAM), Rambus DRAM (RDRAM) or any device capable of supporting high-speed buffering of data.

In one embodiment, an operating system of prover platform 200 may load trusted software (SW) module 400 within memory 220. Representatively, trusted software module 400 is, in one embodiment, tamper resistant software, such as a run-time protected application, which may be referred to herein as a verifier. In one embodiment, trusted SW module 400 may require equivalently trusted or protected access to peripheral devices, such as, graphics cards 260 and I/O device cards 250, referred to herein as trusted hardware devices or THDs. In general, such access requires that trusted SW module 400 be able to identify the devices' capabilities and/or specific manufacturer and version number of the device, and then establish an authenticated, encrypted session, referred to herein as a "secure session," with the device to permit the exchange of data that cannot be snooped or spoofed by other software in the system.

The traditional method of both identifying the device and simultaneously establishing a secure session is to use a one-side authenticated Diffie-Hellman (DH) key exchange process. In this process, the device is assigned a unique public/private Rivest, Shamir and Adelman (RSA) or elliptic curve cryptography (ECC) key pair. The device holds and protects the private key while the public key, along with authenticating certificates may be released to a verifier. During the DH key exchange process, the device signs a message using its own private key, which is verified using the corresponding public key. This permits the verifier to authenticate that the message did, in fact, come from the device of interest.

However, because the authentication process uses RSA or ECC keys, the device has a unique and provable identity. Any verifier that can get the device to sign a message with its private key can prove that the specific device is present in a system. Given that devices rarely migrate between systems, this also represents a provable unique system identity. Furthermore, the device's public key, itself, represents a constant, unique value; referred to herein as "unique, device identification information". In some circles, these characteristics are construed as a significant privacy problem. Accordingly, in one embodiment, a direct proof (DP) signature key is used instead of a traditional RSA or ECC keys using THD 300, as further illustrated in FIG. 3.

Figure 3:
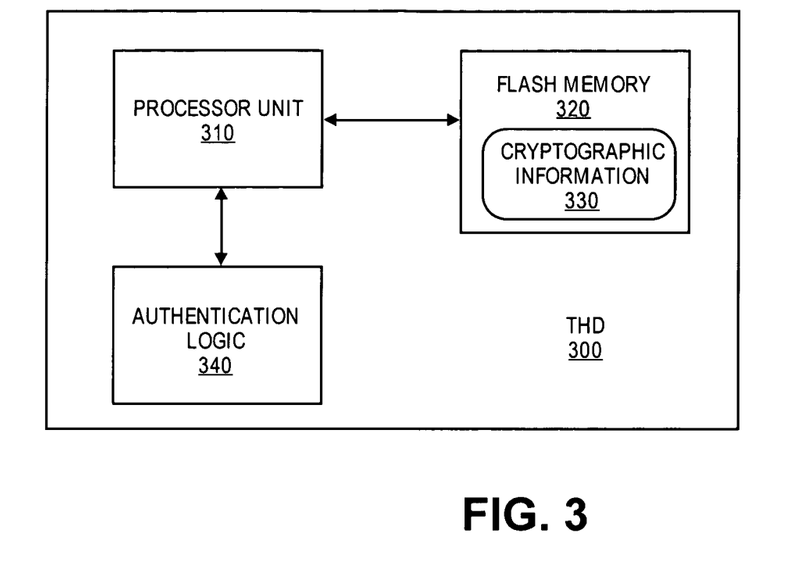
FIG. 3 is a block diagram further illustrating the THD of FIGS. 1 and 2, in accordance with one embodiment.

FIG. 3 illustrates THD 300 of prover platform 200, in accordance with one embodiment. THD 300 is a cryptographic device that is manufactured by device manufacturer(s) 110. In one embodiment, THD 300 comprises processor unit 310 with a small amount of on-chip memory encapsulated within a package. THD 300 provides authentication information to verifier platform 102 that would enable it to determine that the authentication information is transmitted from a valid THD. The authentication information used is non-unique data that would make it highly unlikely that the THD's or prover platform's identity can be determined by verifier platform 102.

In one embodiment, THD 300 further comprises non-volatile memory 320 (e.g., flash) to permit storage of cryptographic information such as one or more of the following: keys, hash values, signatures, certificates, etc. In one embodiment, the cryptographic information is a direct proof (DP) signature key received from a certifying manufacturer of the respective device. As shown below, a hash value of "X" may be represented as "Hash(X)". Of course, it is contemplated that such information may be stored within external memory 240 of platform 200 in lieu of flash memory 320. The cryptographic information may be encrypted, especially if stored outside THD 300.

In one embodiment, THD 300 includes authentication logic 340 to respond to an authentication request from a verifier platform. In one embodiment, authentication logic 340 convinces or proves to a verifier that THD 300 has stored cryptographic information generated by a certifying device manufacturer, without revealing the cryptographic information or any unique device identification information. As a result, authentication logic 340 performs the requested authentication while preserving the identity of the device. Authentication logic 340 is further illustrated with reference to FIG. 4.

Referring again to FIG. 2, in one embodiment, graphics cards 260 and I/O device cards 250 include THD 300 to enable trusted software module 400 to establish trustable, protected access with the various peripheral devices of second platform 200. As illustrated with reference to FIG. 4, authentication logic 340 includes one-way authentication logic 360. In one embodiment, one-way authentication logic 360 responds to, for example, a one-way authentication key exchange request from trusted SW module 400. As described in further detail below, using key logic 370, THD 300 stores a DP signature key assigned to THD 300 from a certifying manufacturer.

Figure 4:
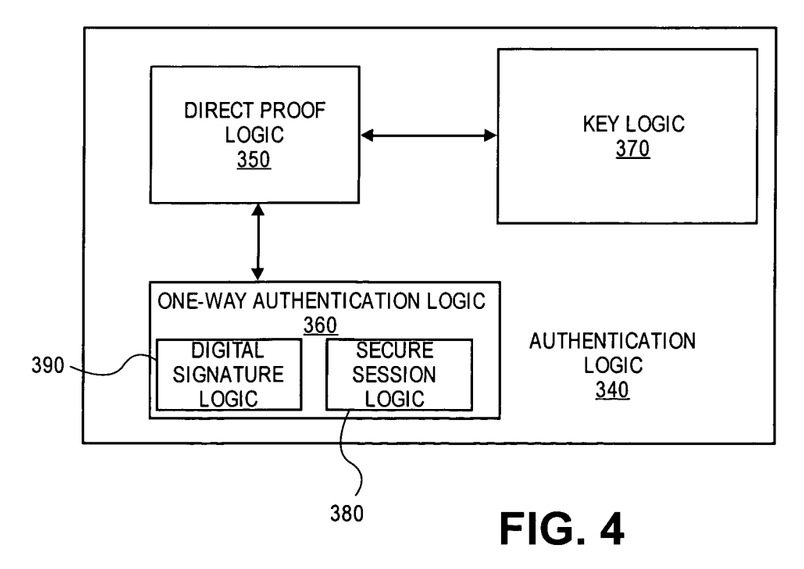
FIG. 4 is a block diagram further illustrating authentication logic of FIG. 3, in accordance with one embodiment.

As a result, digital signature logic 390 signs a message transmitted to SW module 400 during the authentication process using its DP private signature key. In one embodiment, the signature key is verified according to a public key for a family of platforms defined by the manufacturer of the THD. Accordingly, SW module 400 is able to authenticate a peripheral device within system 200 without requiring disclosure of any unique device identification information. Subsequently, secure session logic 380 uses a session key S to encrypt transmitted information to SW module 400 and decrypt received information from SW module 400. The session key S could also be used by the sender to add message authentication code values, which are then checked by the receiver of the message.

As further illustrated in FIG. 4, direct proof logic 350 engages in an interactive direct proof, as described in further detail below, to convince a verifier that the prover platform 200 contains cryptographic information from a certifying manufacturer without revealing the cryptographic information. As described below, key logic 370 performs platform set-up of THD 300 to receive a unique, secret private pair (c,f). In one embodiment, f is close to a fixed value Z, i.e. $0<f-Z<W$ for a fixed value W and the pair (c,f) satisfies the equation $c=f^d \bmod n$, and e,n,Z,W are part of the public key and "d" is a private key of a certifying manufacturer of TMP 300.

II. Platform Set-Up

A "platform family" may be defined by the device manufacturer to include one or more types of platforms or trusted hardware devices. For instance, a platform family may be the set of all platforms (members) that have the same security relevant information. This security relevant information could include the secret key pair (c,f) from the certifying manufacturer. It could also include the manufacturer and model number of the particular platform or device. For each platform family, a device manufacturer creates the cryptographic parameters that the manufacturer uses for that platform family. The device manufacturer creates a signature key that it uses to sign the secrets for the devices (e.g., platform 200 or THD 300) that it manufactures as shown in FIGS. 5-6.

Figure 5:
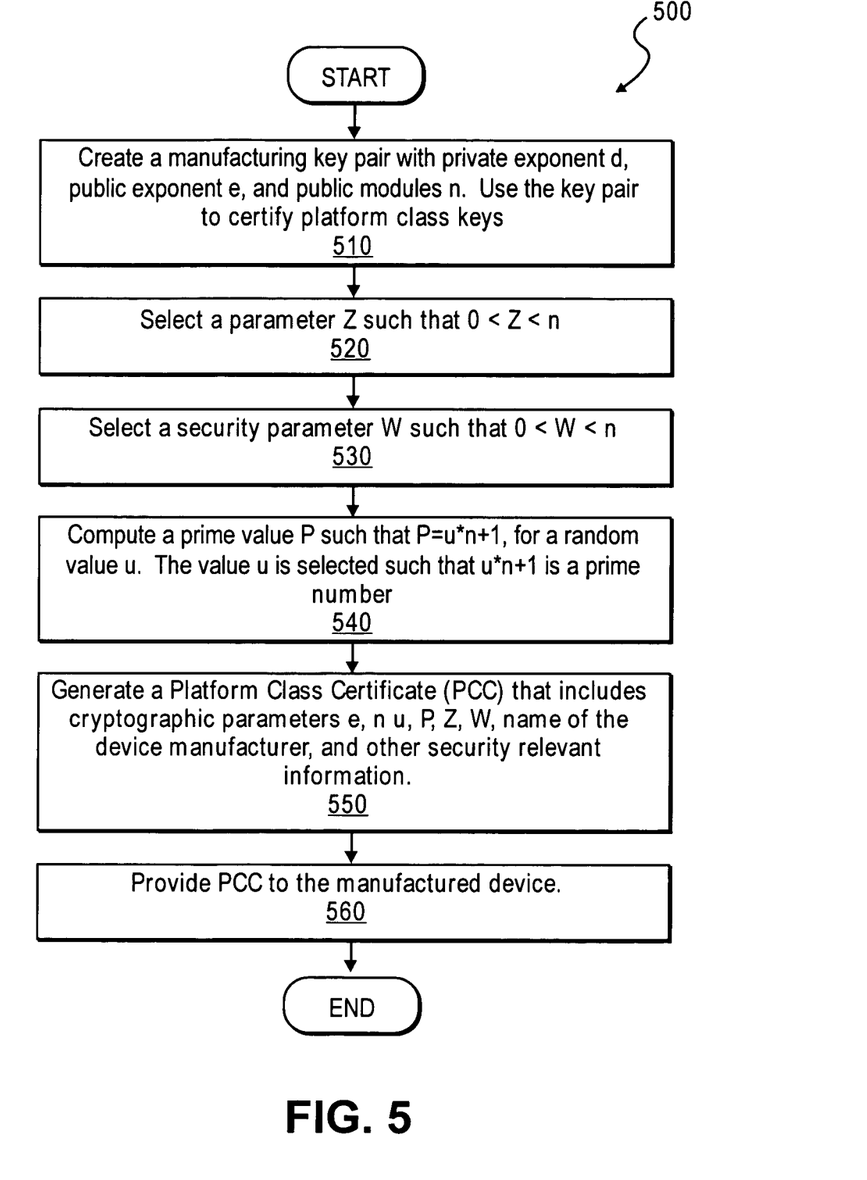
FIG. 5 is a flowchart illustrating a method to set-up a THD once manufactured by a certifying manufacturer, in accordance with one embodiment.
Figure 6:
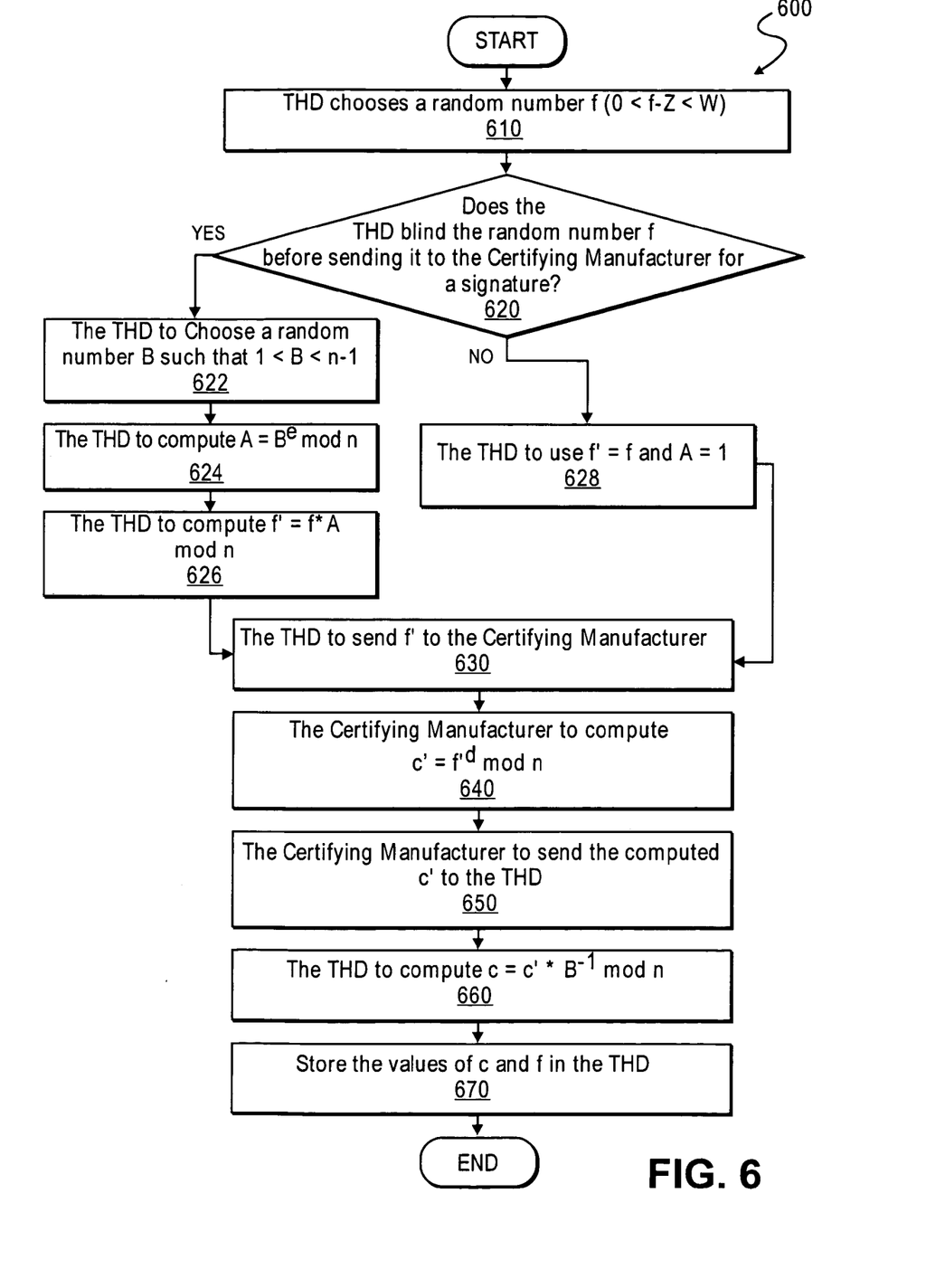
FIG. 6 is a flowchart illustrating a method to assign a secret key pair to a THD, in accordance with one embodiment.

FIG. 5 is a flowchart illustrating a method 500 to form a platform family certificate (PFC) in accordance with one embodiment. In one embodiment, the device manufacturer utilizes a public key cryptographic function (e.g., an RSA function) to create an RSA public/private key pair with public modulus n, public exponent e, and private exponent d (block 510). The public key is based on values e,n while the private key is based on d,n. This can be created using well known methods, such as those described in *Applied Cryptography*, by Bruce Schneier, John Wiley & Sons; ISBN: 0471117099; Second Edition (1996). In one embodiment, modulus n should be chosen large enough so that it is computationally infeasible to factor n.

The device manufacturer specifies a parameter Z, which is an integer between zero (0) and n (block 520). The device manufacturer specifies a security parameter W, which is an integer between zero (0) and n (block 530). However, picking W too small or too large may introduce a security failure. In one embodiment of the invention, W is selected to be approximately $2^{160}$. Selecting W to be between $2^{80}$ and the square root of n is recommended. In one embodiment of the invention, the device manufacturer computes a prime number P, such that P=u*n+1 (block 540). Any value of u can be used; however, to retain an acceptable level of security, the value P should be large enough so that computing a discrete logarithm "mod P" is computationally infeasible.

The device manufacturer generates a Platform Family Certificate that comprises cryptographic parameters e, n, u, P, Z, W, the security relevant information of the platform family, and the name of the device manufacturer (block 550). In one embodiment, the parameters u and P would not both be included since given n and one of these parameters, the other can be computed by P=u*n+1. In one embodiment, the device manufacturer uses the same cryptographic parameters e, n, u, P, W for several different platform families, and just varies the value Z for the different platforms. In this case, the values of Z may be chosen to differ by approximately or at least 4 W, although the selected difference is a design choice.

Once the Platform Family Certificate is generated, the device manufacturer provides the Platform Family Certificate to the platforms or devices it manufactures which belong to that particular platform family (block 560). The distribution of cryptographic parameters associated with the Platform Family Certificate from a prover (e.g., prover platform 200 in FIG. 1) to a verifier may be accomplished in a number of ways. However, these cryptographic parameters should be distributed to the verifier in such a way that the verifier is convinced that the Platform Family Certificate was generated by the device manufacturer.

For instance, one accepted method is by distributing the parameters directly to the verifier. Another accepted method is by distributing the Platform Family Certificate signed by a certifying authority, being the device manufacturer as one example. In this latter method, the public key of the certifying authority should be distributed to the verifier, and the signed Platform Family Certificate can be given to each platform member in the platform family (prover platform). The prover platform can then provide the signed Platform Family Certificate to the verifier.

FIG. 6 is a flowchart illustrating a method 600 for the setup performed for a prover platform or trusted hardware device manufactured according to one embodiment, such as, for example, by key logic 370, as shown in FIG. 4. The THD of the prover platform chooses a random number f such that $0<f-Z<W$ (block 610). The THD may blind this random number f before sending it to the certifying manufacturer for signature (block 620). This blinding operation is performed to obfuscate the exact contents of the random number f from the certifying manufacturer. In one embodiment, the THD chooses a random value, B, where $1<B<n-1$ (block 622), and computes $A=B^e \bmod n$ (block 624). Then, the THD computes $f'=f*A \bmod n$ (block 626). If the THD does not blind f, then the THD uses f'=f and A=1 (block 628).

After performing these computations, THD sends f' to the certifying manufacturer (block 630). The certifying manufacturer computes $c'=f'^d \bmod n$ (block 640), and provides c' to the prover (block 650). The THD of the prover computes $c=c'*B^{-1} \bmod n$ (block 660). Notice that this implies that $c=f^d \bmod n$. The values c and f are then stored in the THD or are encrypted by the THD and stored in external storage within the prover (block 670). As described herein, c,f is referred to as a signature key of the THD, or referred to as cryptographic information and may also be referred to herein as a "member key".

Operation of the THD to perform a direct proof to convince a verifier that the trusted hardware device or prover platform possesses cryptographic information from a certifying manufacturer is described within co-pending U.S. application Ser. No. 10/675,165, filed Sep. 30, 2003. In the Direct Proof scheme, the prover's signature used in a direct proof ("direct proof signature") is validated using a public key if the platform manufacturer (issuer). Thus all members can have their signatures validated using the same public key. It can be proven that a direct proof signature created by a member does not identify which member created the direct proof signature.

To prove to a verifier that the THD contains a unique secret pair, the THD may obtain a value for B to use as a base according to the random base option. For example, the THD may compute $k=B^f \bmod N$ and construct a Proof that the THD possesses secret key pair (f,c), such that $f=c^e \bmod n$ and $k=B^f \bmod n$, without revealing any additional information about f and c. The TPM may give B,k and the proof as a direct proof signature to the verifier in response to a signature request. Accordingly, as described herein, the values B and k and the proof are referred to herein as a direct proof signature. In one embodiment, the TPM chooses a random base value, B, where $1<B<n-1$ (block 622), and computes $k=B^f \bmod n$ (block 624), in accordance with the "random base option". Alternatively, verifier provides base value B to the TPM in accordance with the "named base option". THD may use different B values with different verifiers so that the verifiers may not know that they received the proof from the same THD.

Accordingly, as described above, direct proof defines a protocol in which a certifying manufacturer (issuer) defines a family of members that share common characteristics, as defined by the issuer. The issuer generates a family public key and private key (Fpub and Fpri) that represents the family as a whole. Using Fpri, the issuer can also generate a direct proof signature key (DPpri) for each individual member in the family, as described above. Accordingly, any message signed by an individual DPpri can only be verified using the family public key Fpub. However, such verification only proves that the signer is a member of a platform family. As a result, no unique device identification information about the individual member is exposed.

Figure 7:
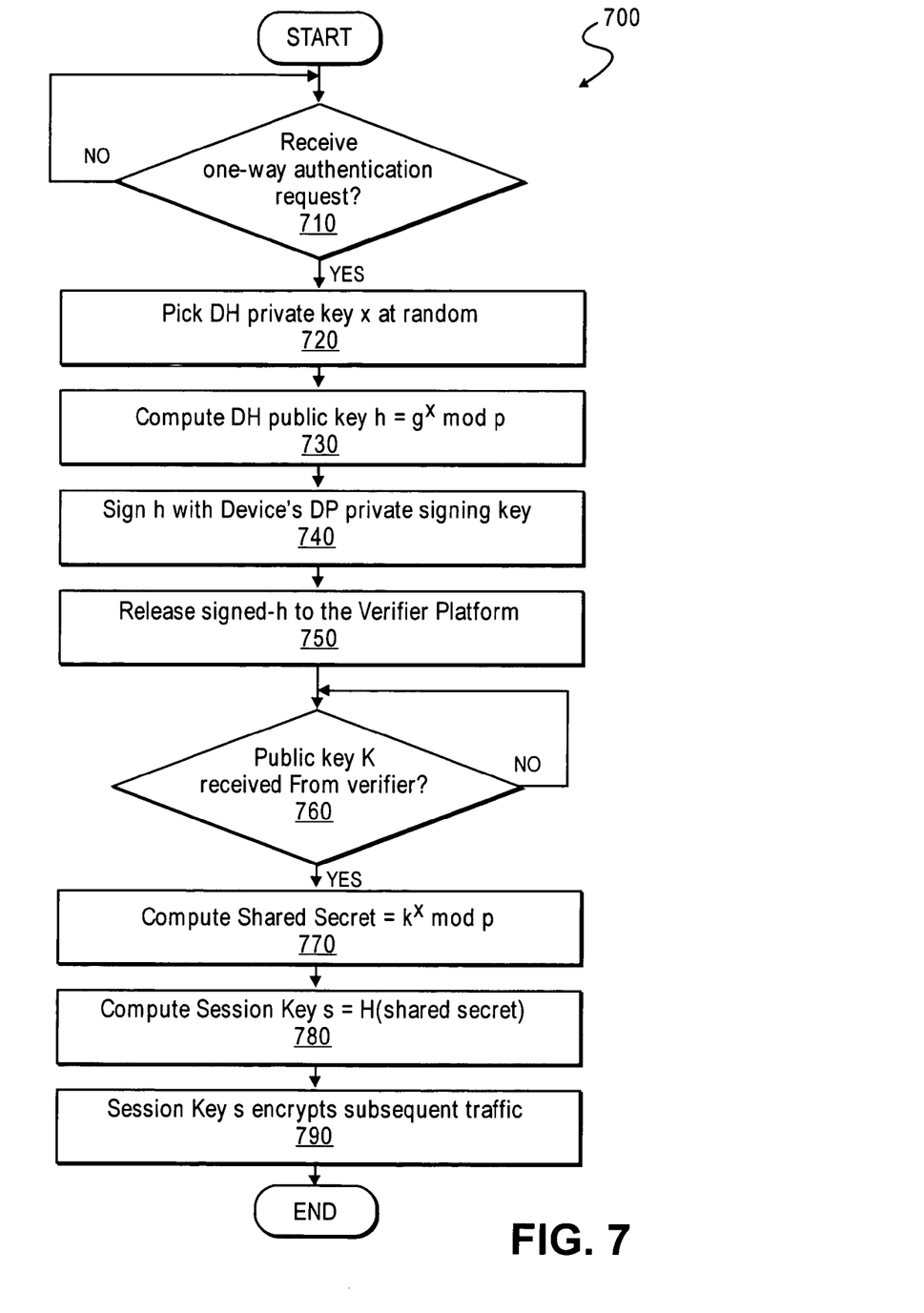
FIG. 7 is a flowchart illustrating a method performed by a prover platform to establish an encrypted session in response to a one-way authentication request, in accordance with one embodiment.

Accordingly, FIG. 7 illustrates a method 700 performed by, for example, one-way authentication logic 360 of THD 300, as illustrated with reference to FIG. 4, in accordance with one embodiment. At process block 710, it is determined whether a one-way authentication request is received from a verifier. In one embodiment, the verifier is a trusted software executable, such as, for example, trusted software module 400, as illustrated with reference to FIG. 1. In one embodiment, a trusted hardware device (prover) is a graphics card, an I/O card or other like hardware device.

Representatively, at process block 720, the trusted hardware device picks a Diffie-Hellman (DH) private key x at random. At process block 730, the hardware device computes a public key h, which equals $h=g^x \bmod p$. Once the public key h is computed, at process block 740, the hardware device signs the public key using, for example, a DP private signature key held by, for example, a THD of the trusted hardware device. As indicated above, by signing public key h with DP private signing key, an identity of the hardware device is preserved.

At process block 750, the hardware device releases the signed public key to the verifier. At process block 760, it is determined whether a public key k is received from the verifier. Once received, at process block 770, the hardware device computes shared key, or shared secret, which equals $k^x \bmod p$. Once the share key, or shared secret, is computed, at process block 780, the trusted hardware device computes session key S according to a function of the shared secret h (shared secret). Once the session key S is computed, at process block 790, the session key S encrypts subsequent traffic with the verifier platform to establish an encrypted session between, for example, graphics card 260-1 and trusted SW module 400, in accordance with one embodiment.

Figure 8:
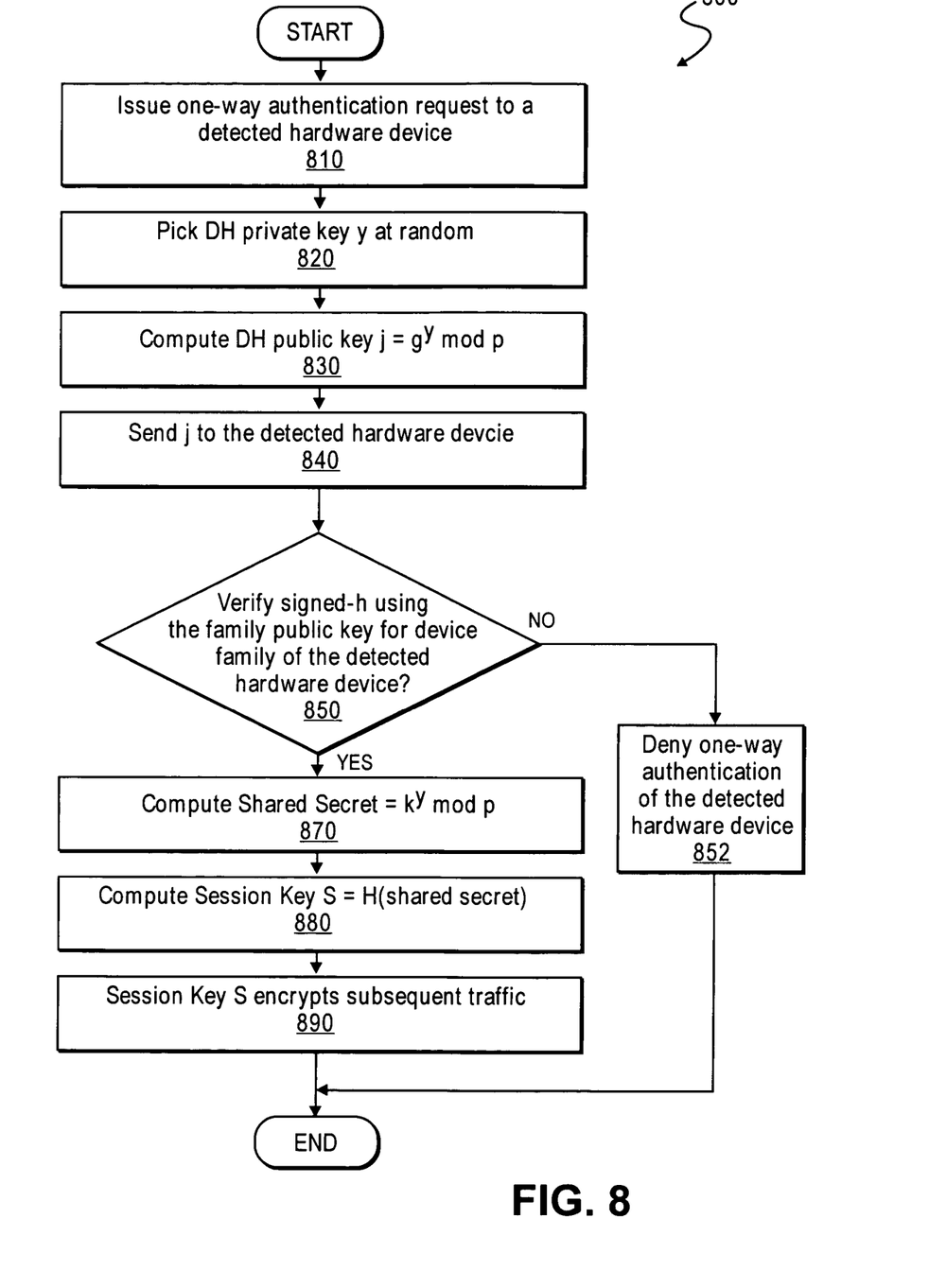
FIG. 8 is a flowchart illustrating a method for issuing a one-way authentication request to a detected hardware device in order to establish an encrypted session with the detected hardware device, in accordance with one embodiment.

FIG. 8 is a flowchart illustrating a method 800 performed by a verifier, such as, for example, trusted SW module 400 of FIG. 1, in accordance with one embodiment. At process block 810, a verifier platform issues a one-way authentication request to a detected hardware device. Once issued, at process block 820, the verifier picks or selects a DH private key y at random. At process block 830, the verifier computes a DH public key j (public key $j=g^y \bmod p$.) Once the public key j is computed, the verifier sends the public key j to the detected hardware device.

As part of the one-way authentication key exchange request process, as described herein, the verifier will receive a signed public key h from the detected hardware device. Accordingly, at process block 850, the verifier will verify the signed h using the family public key for the device family of the detected hardware device. In one embodiment, this is performed by receiving a family platform certificate for a family defined by a certifying manufacturer of the hardware device, which includes the hardware device.

In one embodiment, the family platform certificate may include, but is not limited to, cryptographic parameters defined by the issuer of the platform family, including a public key of the platform family and a name of the certifying manufacturer. Accordingly, using the family public key, the verifier, such as, for example, trusted SW module 400 of FIG. 1, may verify that the identified, or detected, hardware device is a member of an authenticated platform family. Otherwise, at process block 852, the trusted SW module 400 denies one-way authentication of the detected hardware device.

In one embodiment, as part of the verification process, the verifier may have one or more revoked DP private signature keys. Accordingly, in one embodiment, the verifier may want to establish that the DP signature that was received was not created using one of the revoked keys. Each DP signature contains a pseudonym, $k=B^f \mod P$, for a known base B, and private key f. The verifier can take each of the revoked keys, f1, . . . , fr, and compute $k_i=B^{fi} \mod P$. If $k=k_i$, then the verifier knows that the signature was computed using revoked key fi, and will thus reject the signature.

Once the detected hardware device is authenticated as a trusted hardware device, at process block 870, the verifier computes a shared secret of the form $k^y \mod p$. At process block 880, the verifier computes session key S according to a function H of the shared secret key (SSK) (H(SSK)). Finally, at process block 890, the verifier will use session key S to encrypt and integrity protect subsequent traffic between the verifier and the detected hardware device to establish a secure session to prohibit snooping or identification of data transmitted between the trusted hardware device and the verifier.

Accordingly, in one embodiment, a device, such as a graphics, sound, video or other like card, including a THD as described herein, can be authenticated as belonging to a specific family of devices, which may include assurances about the behavior or trustworthiness of the device. However, such device, once detected and issued a one-way authenticated key exchange request, may engage in such request to establish an encrypted session without exposing any uniquely identified information that could be used to establish a unique identity representing the system. As such, one-way authenticated key exchange requests are provided or enabled by THD described herein, while avoiding any privacy concerns associated with conventional techniques.

There are other methods for forming Direct Proof signatures. The invention can use these other methods for Direct Proof signatures as well. It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A method comprising:
    authenticating a digital signature of a hardware device according to a public key of an issuer of a platform family that includes the hardware device, wherein a private signature key used by the hardware device to sign a received message is jointly computed by the hardware device and the issuer during a setup procedure with the issuer, but is unknown to the issuer;
    establishing a secure session with the authenticated hardware device according to a session key formed from a key exchange using the received message; and
    using the same public key of the issuer to authenticate multiple hardware devices, the hardware devices to compute different private signature keys, without disclosing any unique identification information of any authenticated hardware devices,
    wherein the different private signature keys are jointly computed by the hardware device and the issuer during respective setup procedures with the issuer, but are unknown to the issuer.

2. The method of claim 1, wherein authenticating comprises:
    receiving a message from the hardware device including the digital signature formed according to the private signature key assigned to the hardware device by the issuer;
    verifying the digital signature of the hardware device according to the public key of the issuer without disclosure of any unique, identification information of the hardware device; and
    computing the session key according to a shared key formed from the key exchange using the received message.

3. The method of claim 2, wherein computing the session key comprises:
    computing a shared key with the hardware device from the key exchange using the digitally signed message received from the hardware device; and
    processing the shared key to form the session key.

4. The method of claim 1, wherein prior to authenticating, the method comprises:
    selecting a random secret value y;
    computing a public key k according to the random secret value y; and
    transmitting the public key k to the hardware device.

5. The method of claim 1, wherein authenticating comprises:
    identifying the issuer of the private signature key to the hardware device;
    selecting a family public key from a family of members defined by the issuer; and
    verifying, according to the selected family public key, that the hardware device is a member of the family defined by the issuer.

6. The method of claim 5, wherein identifying the issuer comprises:
    determining a digital certificate for the hardware device; and
    identifying the public key of the issuer according to the digital certificate.

7. The method of claim 1, wherein establishing the secure session comprises:
    encrypting transmitted information to the hardware device with the session key; and
    decrypting received information from the hardware device using the session key.

8. The method of claim 1, wherein authenticating further comprises:
denying authentication of the hardware device if the private signature key of the device is compromised.

9. The method of claim 8, wherein denying authentication further comprises:
determining whether a digital signature attached to the digitally signed message was generated with a revoked private signing key; and
if the digital signature was created with a revoked key, rejecting the digital signature.

10. The method of claim 8, wherein denying authentication further comprises:
(a) selecting a revoked key from a revoked key list;
(b) verifying that the digital signature was not created with the revoked key; and
repeating (a)-(b) for each revoked key listed in the revoked key list.

11. A method comprising:
transmitting a message to a verifier in response to an authentication request, the message signed by a hardware device using a private signature key;
authenticating, by the verifier, a digital signature of the hardware device according to a public key of an issuer of a platform family that includes the hardware device, wherein the private signature key used by the hardware device to sign the message is jointly generated by the hardware device and the issuer during a setup procedure with the issuer, but is unknown to the issuer, and the hardware device is authenticated, without disclosing any unique identification information of the hardware device; and
establishing a secure session with the verifier according to a session key formed from a key exchange using a message received from the verifier.

12. The method of claim 11, wherein prior to transmitting the signed message, the method further comprises:
receiving a one-way authenticated key exchange request from the verifier;
computing a public key k according to a selected random value x; and
digitally signing the public key using the private signature key of the hardware device.

13. The method of claim 11, wherein prior to transmitting the signed message, the method further comprises:
generating, by the issuer, a family public/private key pair for a family of devices defined by the issuer;
computing the private signature key for the hardware device using the family private key without retaining a copy of the private signature key assigned to the hardware device;
and transmitting the private signature key to the hardware device.

14. The method of claim 11, wherein establishing the secure session comprises:
computing a shared secret key according to a public key received from the verifier; and
processing the shared key to form the session key.

15. The method of claim 11, wherein establishing the secure session comprises:
encrypting transmitted information to the verifier with the session key; and
decrypting received information from the verifier using the session key.

16. The method of claim 11, wherein prior to transmitting the signed message, the method further comprises:
receiving a platform family certificate for a family of devices defined by the issuer, the platform class certificate including at least cryptographic parameters defined by the issuer for the platform family,
a public key of the issuer and a name of the issuer; and
transmitting the received platform family certificate to the verifier.

17. The method of claim 16, wherein transmitting the platform family certificate comprises:
signing, by a certifying authority, the platform family certificate; and
providing a public key of the certifying authority to the verifier to enable the verifier to authenticate the signed platform family certificate once received from the hardware device.

18. The method of claim 11, wherein prior to transmitting the digitally signed message, the method further comprises:
receiving a unique secret key pair (f,c), where F is the private signature key of the hardware
device; and
digitally signing the message according to the private signature key f.

19. The method of claim 18, wherein the secret key pair includes the private signature key f of the form ce mod n and private key c is of the form c=f mod n, where He", "n" is a public key and "d" is a private key of a certifying manufacturer of the hardware device.

20. An apparatus, comprising:
a flash memory to store cryptographic information received from a certifying manufacturer of a platform family that includes the apparatus, wherein the cryptographic information is used to jointly compute a private signature key by the hardware device and the certifying manufacturer during a setup procedure with the certifying manufacturer, but is unknown to the certifying manufacturer; and
a trusted platform module to transmit a message, signed using the private signature key, to a verifier in response to an authentication request, the trusted platform module to establish a secure session with the verifier according to a session key, the session key formed from a key exchange using a message received from the verifier, without disclosing any unique identification information of the apparatus.

21. The apparatus of claim 20, wherein the trusted platform module further comprises:
one-way authentication logic to receive a one-way authenticated key exchange request from the verifier and to compute a public key k according to a selected random value x; and
digital signature logic to digitally sign the public key k using a private signature key of the apparatus.

22. The apparatus of claim 20, wherein the trusted platform module further comprises:
one-way authentication logic to compute a shared secret key with the verifier according to a public key received from the verifier and to process the shared key to form the session key to enable establishment of the secure session with the verifier.

23. The apparatus of claim 20, wherein the trusted platform module comprises: secure session logic to encrypt transmitted information to the verifier using the session key and to decrypt received information from the verifier using the session key.

24. The apparatus of claim 20, wherein the apparatus is a graphics card.

25. The apparatus of claim 20, wherein the cryptographic information comprises: a secret key pair (f, c), where f is a private signature key of the form ce mod n and c is a private key of the form c f mod n, where He", "n" is a public key and "d" is a private key of the certifying manufacturer.

26. A system comprising:
a processor to execute a trusted software module to issue a one-way authentication key exchange request to the hardware device;
a chipset coupled to the processor; and
a hardware device coupled to the chipset, the hardware device including a trusted platform module, the trusted platform module to transmit a signed message to the trusted software module in response to a one-way authentication request from the trusted software module and to establish a secure session with the trusted software module according to a session key formed from a key exchange using a message received from the trusted software module without disclosing any unique identification information of the hardware device,
wherein the trusted software module to authenticate a digital signature of a hardware device
according to a public key of an issuer of a platform family that includes the hardware device, wherein a private signature key used by the hardware device to sign the message is jointly computed by the hardware device and the issuer during a setup procedure with the issuer, but is unknown to the issuer.

27. The system of claim 26, wherein the chipset comprises a graphics controller.

28. The system of claim 26, wherein the hardware device comprises a graphics card.

29. The system of claim 26, wherein the trusted software module is to receive a platform family certificate signed by a certifying authority, the platform family certificate to include cryptographic parameters defined by the certifying manufacturer for a platform family, and a public key of the certifying manufacturer to enable authentication of the digital signature of the hardware device.

30. A non-transitory computer-readable storage medium having stored thereon instructions which may be used to program a system to perform a method, comprising:
authenticating a digital signature of a hardware device according to a public key of an issuer of a platform family that includes the hardware device, wherein a private signature key used by the hardware device to sign a received message is jointly computed by the hardware device and the issuer during a setup procedure with the issuer, but is unknown to the issuer;
establishing a secure session with the authenticated hardware device according to a session key formed from a key exchange using the received message; and
using the same public key of the issuer to authenticate multiple hardware devices that use
different private signature keys without disclosing any unique identification information of any authenticated hardware devices,
wherein the different private signature keys are jointly computed by the hardware device and the issuer during respective setup procedures with the issuer, but are unknown to the issuer.

31. The computer-readable storage medium of claim 30, wherein authenticating comprises:
receiving a message from the hardware device including the digital signature formed according to the private signature key assigned to the hardware device by the issuer;
verifying the digital signature of the hardware device according to the public key of the issuer without disclosure of any unique, identification information of the hardware device; and
computing the session key according to a shared key formed from key exchange using the received message.

32. The computer-readable storage medium of claim 31, wherein computing the session key comprises:
computing a shared key with the hardware device from the key exchange using the digitally signed message received from the hardware device; and
processing the shared key to form the session key.

33. The computer-readable storage medium of claim 30, wherein prior to authenticating, the method comprises:
selecting a random secret value y;
computing a public key k according to the random secret value y; and
transmitting the public key k to the hardware device.

34. The computer-readable storage medium of claim 30, wherein authenticating comprises:
identifying the issuer of the private signature key to the hardware device;
selecting a family public key from a family of members defined by the issuer; and
verifying, according to the selected family public key, that the hardware device is a member of the family defined by the issuer.

35. The computer-readable storage medium of claim 34, wherein identifying the issuer comprises:
determining a digital certificate for the hardware device; and
identifying the public key of the issuer according to the digital certificate.

36. The computer-readable storage medium of claim 30, wherein establishing the secure session comprises:
encrypting transmitted information to the hardware device with the session key; and
decrypting received information from the hardware device using the session key.

37. The computer-readable storage medium of claim 30, wherein authenticating further comprises:
denying authentication of the hardware device if the private signature key of the device is compromised.

38. The computer-readable storage medium of claim 37, wherein denying authentication further comprises:
determining whether a digital signature attached to the digitally signed message was generated with a revoked private signing key; and
if the digital signature was created with a revoked key, rejecting the digital signature.

39. The computer-readable storage medium of claim 37, wherein denying authentication further comprises:
(a) selecting a revoked key from a revoked key list;
(b) verifying that the digital signature was not created with the revoked key; and
repeating (a)-(b) for each revoked key listed in the revoked key list.

* * * * *